United States Patent [19]

Colburn et al.

[11] 3,780,907

[45] Dec. 25, 1973

[54] SYSTEM FOR REMOTE CONTROL OF PACKAGE-DISPENSING STATION

[75] Inventors: Walter E. Colburn, Drexel Hill; Howard M. Trowern, Jr., Malvern; Franklin W. Kerfoot, Jr., Newtown Square, all of Pa.

[73] Assignee: Parke, Davis & Company, Detroit, Mich.

[22] Filed: Oct. 3, 1969

[21] Appl. No.: 863,641

[52] U.S. Cl. ........................ 221/2, 179/2 A, 186/1.2, 194/4 R

[51] Int. Cl. ............................................ E04h 11/00

[58] Field of Search ...................... 340/325; 186/1.2; 221/2, 9, 12, 13; 194/4; 179/2 A, 2 R

[56] References Cited

UNITED STATES PATENTS

| | | | |
|---|---|---|---|
| 2,557,161 | 6/1951 | Timms | 179/2 A |
| 2,708,996 | 5/1955 | Skillman | 194/10 |
| 2,811,583 | 10/1957 | Timms | 179/2 A |
| 3,023,851 | 3/1962 | Stiller | 186/1.2 |
| 3,213,200 | 10/1965 | Vogelman | 179/2 X |
| 3,407,914 | 10/1968 | Simjian | 194/4 |
| 3,471,638 | 10/1969 | DeGroat | 179/2 X |

*Primary Examiner*—Robert B. Reeves
*Assistant Examiner*—Thomas L. Kocovsky
*Attorney*—Paul & Paul

[57] ABSTRACT

A system for the remote control of a plurality of package-dispensing units is disclosed, wherein a data card and card dialer cooperate with a control station interface unit to transmit data across a telephone system network to a receiving station, where the data is operated on by a receiving station interface unit which selects and operates a designated package-dispensing unit, and sends a return signal to the control station. The receiving station interface unit logically operates on the received data through a system of stepper switches and relays, causing solenoid release of a package from the selected dispensing unit.

4 Claims, 3 Drawing Figures

INVENTORS.
WALTER E. COLBURN
HOWARD M. TROWERN, JR
FRANKLIN W. KERFOOT, JR

BY Paul & Paul
ATTORNEYS.

INVENTORS.
WALTER E. COLBURN
HOWARD M. TROWERN, JR.
FRANKLIN W. KERFOOT, JR.
BY Paul & Paul
ATTORNEYS.

PATENTED DEC 25 1973 3,780,907

SHEET 3 OF 3

INVENTORS.
WALTER E. COLBURN
HOWARD M. TROWERN, JR.
FRANKLIN W. KERFOOT, JR.

BY Paul & Paul
ATTORNEYS.

SYSTEM FOR REMOTE CONTROL OF PACKAGE-DISPENSING STATION

BACKGROUND OF THE INVENTION

A. Field of the Invention

This invention lies in the field of remote-control systems, and more particularly a system for operating a plurality of package-dispensing units by remote control.

B. Description of the Prior Art

Communications systems adapted for use with conventional telephone lines or other transmission lines have come into widespread use. For example, with the advent of the digital computer, there have come into use a large number of systems for transmitting data over a transmission line, from a transmitting station to a receiving station, where such data is processed by the computer. Such data-transmission systems are to be distinguished from two-way remote-control systems such as the present invention. Where control of an operation is to be performed at the receiving end, it is necessary to design an interface system which accepts signals transmitted across the standard transmission network, and which interfaces with such network.

Systems are found in the prior art involving remote control of a machine or apparatus by providing for operation of one of a plurality of functions of said apparatus. See U.S. Pat. Nos. 2,810,017 and 3,384,713. Such systems, however, do not operate upon a plurality of devices at the receiving end, and do not provide for transmission of confirming data back to the control station. There remains a need for a two-way system for remote control of a plurality of independently operated units, having data sent from the receiving station to the control station to indicate performance of the intended operation.

SUMMARY OF THE INVENTION

The primary object of our invention is to provide apparatus for the remote control of package-dispensing units.

It is a further object of our invention to provide apparatus which utilizes existing transmission lines for the remote control of a plurality of package-dispensing units which does not interfere with the operation of such transmission lines, and which is simple, convenient, inexpensive and effective for the purpose and which overcomes the disadvantages of the prior art.

It is a still further object of our invention to provide apparatus for the remote control of package-dispensing units which is operated in conjunction with audio transmission between the control station and the receiving station.

It is a still further object of this invention to provide apparatus for remote control of package-dispensing units with which verifying data is transmitted to the control station.

Accordingly, this invention provides novel and effective apparatus for the transmission of coded data from a control station, across an existing transmission network, to a remotely controlled receiving station which is electrically interfaced with such transmission system, the interfaced receiving station operating through a network of switches and relays to operate one of a plurality of package-dispensing units according to the transmitted data. A conventional plastic dial card and card dialer are used to operate dial contacts which are incorporated into a control station interface unit at the control station. A first data set unit provides coupling of the control station interface unit to the transmission network, and a second data set unit makes such transmitted data available at the receiving station. The data, in the form of trains of pulses, is processed by a logic circuit comprised of relays and stepping switches designed to operate a given one of a plurality of package-dispensing units. Upon such successful operation, a verifying signal is transmitted back to the control station, where it is displayed by the control station inferface unit.

DESCRIPTION OF THE PREFERRED EMBODIMENT

Figure 1:
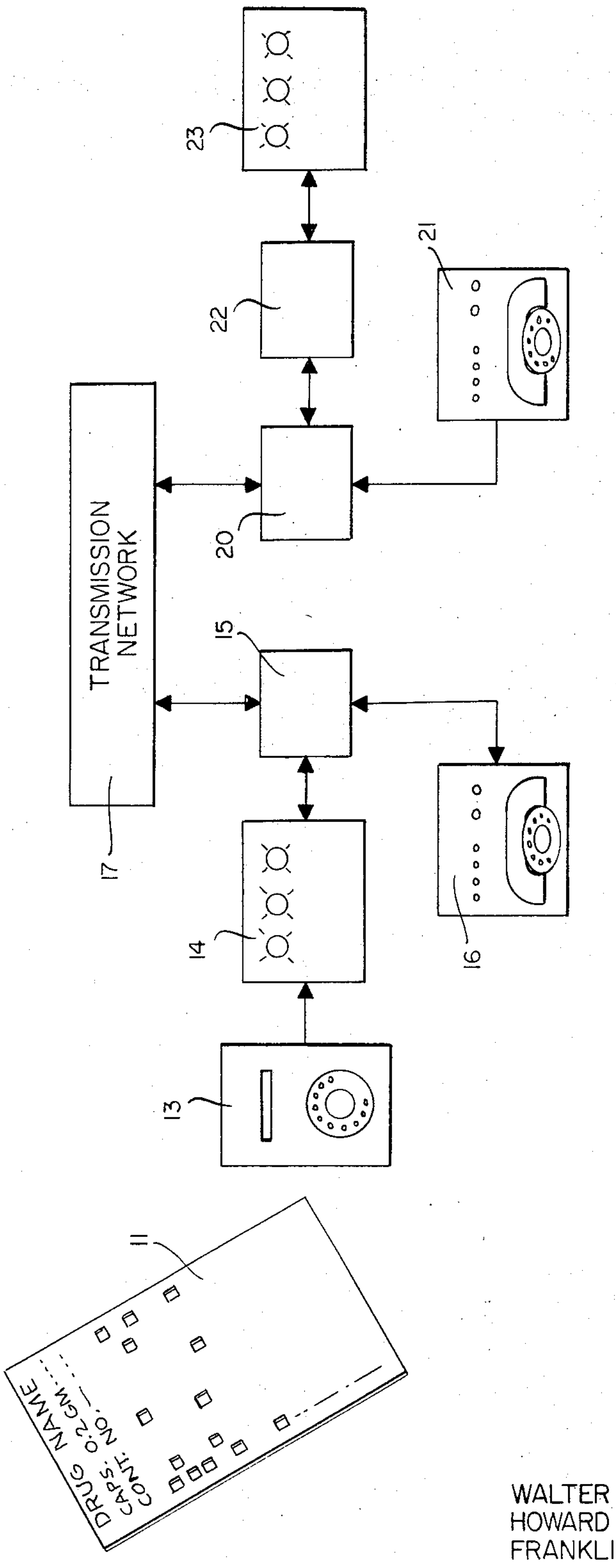
FIG. 1 shows a block diagram representation of the components of the system.

Referring now to the drawings, FIG. 1 shows a block diagram of the components constituting the preferred embodiment of this invention. A plastic dial card 11, such as is conventionally used with card dialed telephones, contains therein punched information relating to the location of the desired package-dispensing station 23, and the particular package-dispensing unit at said station which is to be operated. For each package-dispensing station 23 which is controllable from the control station, there is a complete file of such cards, one card corresponding to each controllable unit. The card 11, when inserted into a card dialer device 13, is operated upon so as to open dial contacts 36 in a repetitive fashion, in the same manner as is accomplished in dialing a conventional telephone. The card dialer device 13 is a conventional commercially available card dialer, such as is available from the Bell Telephone System or other telephone companies. The dial contacts of the device 13 are incorporated into the control station interface unit 14. This unit in turn is coupled to the control station data set 15 which operates in conjunction with control station telephone set 16, which can be operated in either a "talk" or "data" mode by pushing either a "talk" or "data" button. The data set 15, in the preferred embodiment, is a Bell System 103A2, and the telephone is a Bell System 804B1. Any comparable commercially available units may be employed. The output from the data set 15, either coded control information or audio information, is coupled to and transmitted across transmission network 17. Transmission network 17, as used in this invention, is an existing telephone system network. Such network can include telephone lines and/or microwave transmission channels. At the receiving end, the transmitted data is received by receiving station data set 20 which is coupled to and operates with receiving station telephone 21, these two units being complimentary to units 15 and 16 at the control station. The coded information which is received through receiving station data set 20 is operated upon by the circuitry of receiving station interface unit 22, as described in detail hereinbelow. If the receiving station interface unit is properly addressed by the received data, it couples an energizing signal to the appropriate package-dispensing unit of station 23, which contains a plurality of such units, each operated by the energization of a solenoid 68. Each single unit is mechanically constructed to release one package, contained therein, upon the energization of the solenoid. Upon release of one such package, a signal is sent back through the system to control station interface unit 14, where a corresponding bulb 32 is lighted on a control panel. In the event a particular solenoid 68 is energized, but there is no release from the corresponding unit, a bulb 48 on the panel face of station 23 is lighted, to indicate failure to discharge a unit.

In the preferred embodiment of this invention, the control station interface unit 14 is located at a retail pharmacy which services nursing homes or small hospitals. The receiving station is located at such nursing home or small hospital, and the package-dispensing station 23 is a form of electro-mechanical vending machine having therein a plurality of storage units, or bins, each stocked with drugs or packages of drugs, or other medications dispensed by the pharmacy. In operation, when the nurse or other staff member has a prescription to be filled, she calls the pharmacy, establishing conventional telephonic communication with telephone sets 16 and 21 and the transmission system network 17. This is accomplished by switching the telephone sets 16 and 21 to the "talk" mode. The nurse identifies herself, identifies the location of the receiving station, and reads the prescription to the pharmacist. Upon receipt of this information, the pharmacist gives an instruction to switch to the data mode and both units 16 and 21 are so switched. The pharmacist then selects the particular drug dial card 11 corresponding to the drug or other package to be dispensed, from the file corresponding to the particular receiving station, or nursing home, involved. The pharmacist then enters the dial card into the card dialer unit 13, and places same in operation. The operation of card dialer unit 13 generates three trains of pulses which are transmitted through control station data set 15, across the transmission system network 17, and through receiving station data set 20 to the receiving station interface unit 22. Each train contains from one to 10 pulses, the pulses being approximately 50 milliseconds in duration, with a delay of approximately 50 milliseconds between each pulse. The first two pulse trains transmitted contain coded information with respect to the particular package-dispensing unit, or drug bin, to be selected. Since each train carries up to 10 pulses, the two pulse trains carry information from which any given bin out of 100 such bins can be selected. The third pulse train, also carrying from one to 10 pulses, is coded to represent the particular receiving station, or drug station, from which a package is to be issued. Only when this pulse train has been received and interpreted affirmatively would the particular drug bin selected by the first two pulse trains be energized and released.

Upon the release of a package of drugs, a "drug drop lamp" 32 is switched on at the pharmacy by a control signal which is transmitted from the nursing home to the pharmacy. A similar drug drop lamp is lighted on the control panel of the drug station. If the particular package-dispensing unit or bin chosen is empty, in which case no drug package is dropped, an "empty" signal light is energized on the panel of the drug station. Similarly, if the coded number carried by the third pulse train does not represent the receiving station which is coupled to the pharmacy, an "error" signal light is activated on the panel of the drug station. Upon the occurrence of a proper package drop, or an "empty" or "error" signal, voice communication is re-established by switching the telephone units 21 and 16 to the talk mode, whereupon the correctness of the drug dropped is confirmed.

Figure 2:
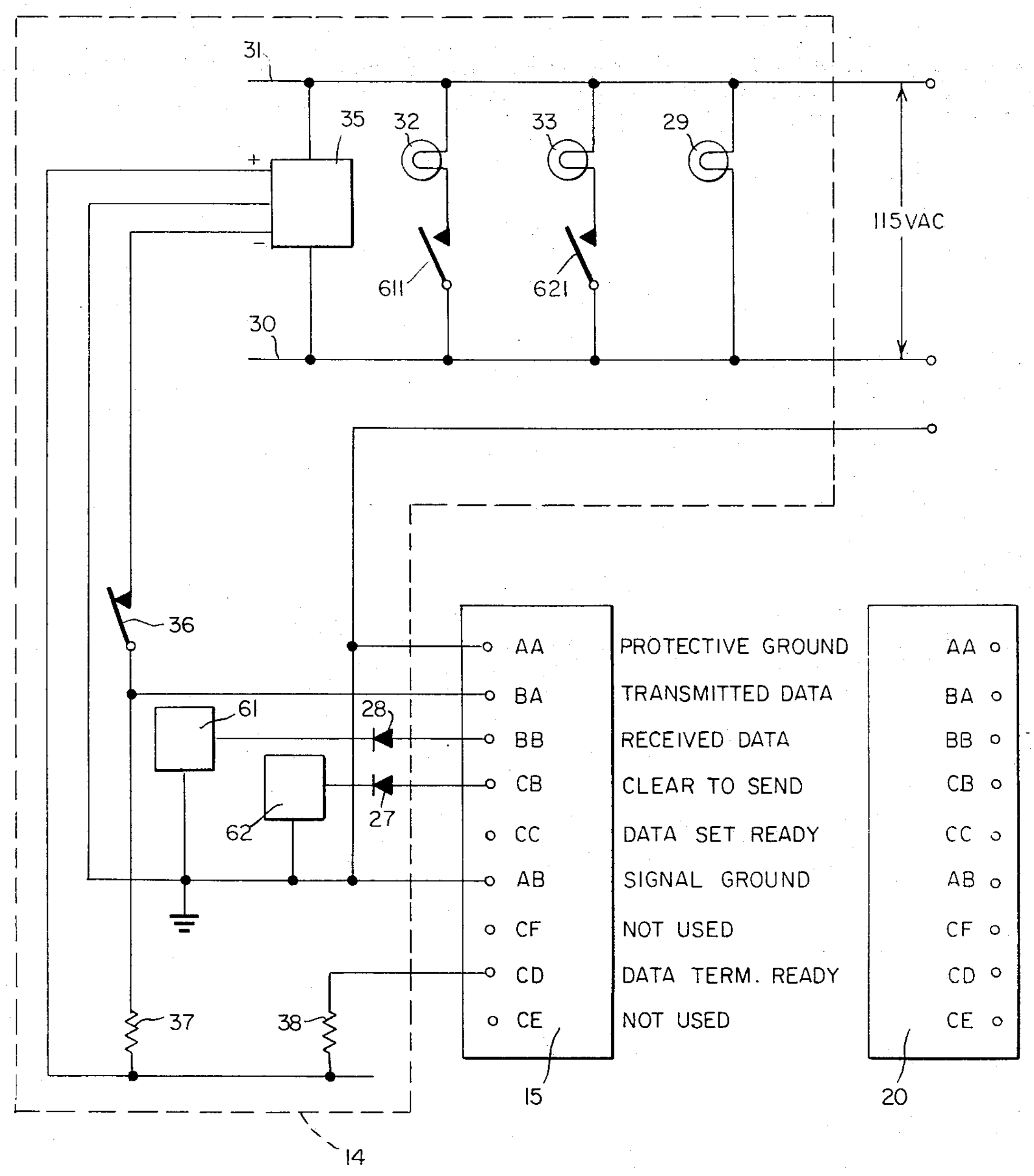
FIG. 2 is a schematic representation of the control station interface, the control station data set, and the receiving station data set.

Referring now to FIG. 2, the control station interface 14, coupled to control station data set 15, and the receiving station data set 20, are shown in schematic diagram form. Interface unit 14 is powered by a conventional 115 volt input. In parallel across the 115 volt lines 30 and 31 are a "power on" bulb 29, a "drug drop" bulb 32 in series with relay contact 611, and a "clear to operate card dialer" bulb 33 in series with relay contact 621. A conventional DC power supply unit 35 provides plus and minus 24 volts. Dial contacts 36, which are operated by card dialer 13, are connected in series with a 1,000 ohm resistor 37 between the minus 24 volt and plus 24 volt lines. The normally closed contacts 36 hold minus 24 volts on channel BA of control station data set 15, except when they are opened, at which time approximately plus 15 volts is placed on channel BA. Similarly, ground is tied to channels AA and AB of data set 15; plug 24 volts is tied through a 330 ohm resistor 38 to channel CD; relay 61 is coupled to ground, and to channel BB through diode 28; and relay 62 is coupled to ground, and to channel CB through diode 27.

The plug voltage on CD enables the use of the "data" button on unit 16 which, when depressed, turns on CC and the "data" light for unit 16, indicating that data set 15 is ready.

Some time after the "data" buttons on both 16 and 21 have been depressed, data sets 15 and 20 will normally establish a connection over 17, resulting in plug 5 to 25 volts on circuit CB of data set 15 indicating "clear to send." This plus voltage is coupled out of circuit CB through diode 27, operating relay 62, in turn closing normally open contacts 621 and energizing the "clear to operate card dialer" bulb 33.

Still referring to FIG. 2, it is seen that transmitted data enters channel BA of control station data set 15, from which it is coupled to the telephone system network. Received data which is incoming from receiving station data set 20, is received on channel BB.

Similarly, at receiving station 20, circuit CD is held plus by coupling through resistor 39 to the plus 24 volt line. This enables the "data" button of 21, which when depressed, puts plug 5 to 25 volts on CC and lights the "data" light on 21. Placing unit 21 in the "talk" mode, or hanging up unit 21, de-energizes circuit CC. Data which was transmitted from control station data set 15 is received on channel BB of receiving station data set 20, and data transmitted from receiving station data set 20 is coupled into channel BA of same.

Figure 3:
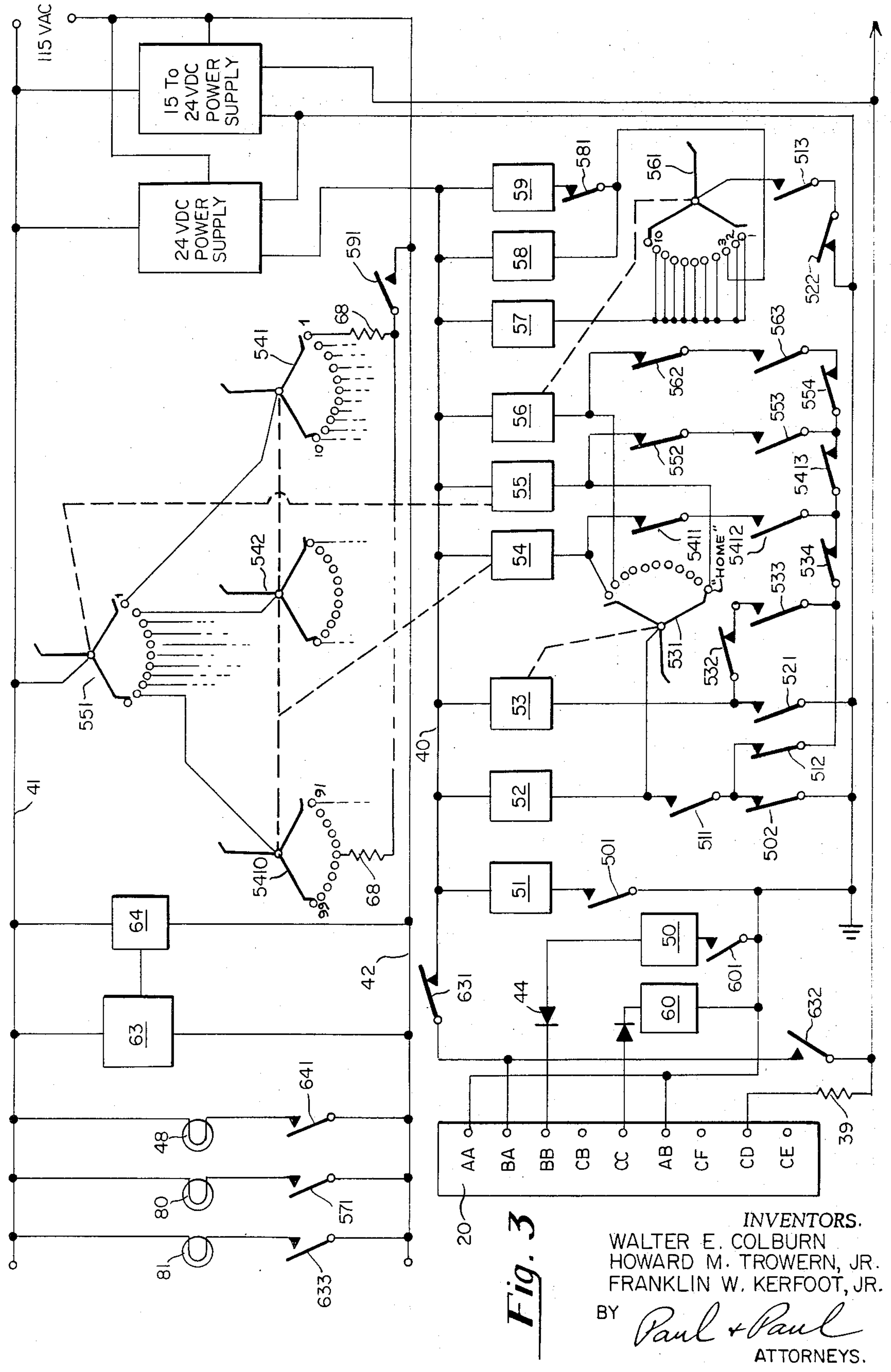
FIG. 3 is a schematic diagram showing the receiving station data set, the receiving station interface unit, and the package-dispensing station, and the interconnections therebetween.

Referring now to FIG. 3, when circuit CC is on, plus voltage is connected through a diode and relay 60 to ground, energizing 60. This closes the normally open contact 601, thus energizing relay 50 which is connected to ground through 601 at one terminal, the other terminal being connected to channel BB through diode 44. It is to be noted that channel BB, in the absence of incoming data, carries a minus voltage.

The circuit diagram of receiving station interface unit 22, as well as the circuitry of station 23, is best understood from an analysis of the operation of these units upon receipt of transmitted data. When data sets 15 and 20 are "clear to send," normally open contacts 501 are closed by the energization of relay 50, placing minus 24 volts across relay 51, between line 40 and ground. Relay 51 is thus energized, causing normally open contacts 511 to close and normally closed contacts 512 to open. Relay 52, coupled in series with contacts 511 and 502 between line 40 and ground, remains unenergized because normally closed contacts 502 are opened due to the energization of relay 50. None of the other relays shown are energized under these conditions.

When the first positive voltage pulse is received through to channel BB of receiving station data set 20, diode 44 opens, de-energizing relay 50. It is thus seen that each time a pulse is received through channel BB, relay 50 de-energizes for the duration of the pulse. Upon the first such de-energization, relay 52 is operated through contacts 511 and 502. This occurs because contacts 501 are quickly returned to their closed position, whereas relay 51 is slow releasing, and consequently holds contacts 511 closed. The energization of relay 52 closes normally open contacts 521, thereby energizing motor magnet 53 which is in series with contacts 521 between line 40 and ground. Relay 52 is also slow releasing, and, once energized, holds during the entire pulse train. Thus, motor magnet 53 remains energized for the duration of the pulse train.

Stepper switch 531, operated by motor magnet 53, is initially in its home position as shown in the drawing. When the first pulse comes through, releasing relay 50 and closing normally closed contacts 502, motor magnet 55, which controls switch 551, is energized, picking switch 551. When contacts 502 open, motor magnet 55 is restored, causing switch 551 to step in a clockwise direction to contact 1 as shown on the drawing. For each successive pulse in the first train, motor magnet 55 will be similarly energized and released, stepping switch 551 once for each pulse.

The common terminal of switch 551 is tied to line 41, being tied to one terminal of the 115 volt AC supply. The other terminal of the 115 volt supply is tied to relay contacts 591. Switches 551 and switches 541 through 5410 thus are designed to select one of the solenoids 68, corresponding to the selected package-dispensing bin. At the end of the first pulse train, switch 551 will provide a contact between line 41 and that one of stepper switches 541 through 5410 corresponding to the 10s digit of the transmitted number. Normally closed contacts 502 then return to their open position, and relay 52 restores, opening contacts 521 coupled in series with motor magnet 53. At this time, upon release of motor magnet 53, switch 531 steps one position in a clockwise direction to contact 1, coupling motor magnet 54 to contacts 511. Motor magnet 54 is designed to step switches 541 through 5410 each time it restores.

When the second train of pulses is introduced, the same procedure is followed, except that motor magnet 54 operates switches 541 through 5410, which are stepped in parallel. At the end of the second train of pulses, there will be a closed circuit from line 41 to one of 100 solenoids corresponding to the 100 package-dispensing bins, as determined by the positions of switches 551 and switches 541 through 5410. However, the designated solenoid is not yet energized, since contacts 591, to which each output of the unit switches is coupled, remains open.

After the second train of pulses has passed, switch 531 is again stepped once clockwise, coupling motor magnet 56 to the common terminal of switch 531. Motor magnet 56 operates switch 561, which is in series with contacts 513 and 522. Switch 561 has eleven outputs, only one of which is wired so as to operate relays 58 and 59. In the embodiment shown on the drawings, output terminal 3, corresponding to number 3 of 10 receiving stations, is hard wired in contact with relay 58 and relay 59. The other of the ten output terminals are wired through to relay 57. The third pulse train, comprised of 1 to 10 pulses, operates motor magnet 56 in the same manner that motor magnet 54 are operated. If the receiving station designation is incorrect, at the end of the third pulse train relay 57 is energized, it being in series with switch 561, normally open contacts 513 which are closed due to the energization of relay 51, and normally closed contacts 522 which close after the completion of the pulse train. Upon energization of relay 57, contacts 571, shown in receiving station 23, are closed, thus energizing error signal light 80 in series with contacts 571 between lines 41 and 42.

If the storage station designation is correct, switch 561 is stepped to the proper position, such that relays 58 and 59 are in a closed series circuit through switch 561, normally open contacts 513 and normally closed contacts 522. Relay 59, a slow releasing relay, is energized through normally closed contacts 581, and closes normally open contacts 591. This provides a closed loop from line 41 to 42 through the selected solenoid, whereupon the selected bin is operated, and, if stocked, a package is discharged. Relay 58, a slow operating relay, is energized after relay 59, causing contacts 581 to open, which in turn de-energizes relay 59. Relay 59 releases slowly, leaving contacts 591 closed for approximately 100 milliseconds.

If a package is available in the selected bin, it drops onto the chute door of the package-dispensing station and is sensed by conventional photocell circuitry, which closes relay 63. Normally closed contacts 631 are opened, and normally open contacts 632 are closed, coupling plus 24 volts through to channel BA of receiving station data set 20. The plus 24 volts on BA sends a signal across the transmission network 17, putting plug 5 to 25 volts on channel BB of control station data set 15, which is coupled through diode 28, causing relay 61 to operate. This closes normally open contacts 611 in series with drug drop light 32, placing 115 volts across light 32. Additionally, contacts 633 are closed, energizing light 81 which is placed across lines 41 and 42. If no package drops, time delay relay 64 operates, closing normally open contacts 641 in series with the "empty" signal light 48, placing 115 volts across said light.

The switches are restored by placing the receiving station telephone unit 16 in the talk mode. This places minus 5 to 25 volts on circuit CC, releasing relay 60, and thus relays 50 and 51. Contacts 533, 5412, 553, and 563, are normally-off contacts which are off when their respective switches are in the "home" position. For all other positions, these contacts are closed. Similarly, contacts 534, 5413, and 554 are closed when their respective switches are in the "home" position, and open otherwise. Thus, with relays 50 and 51 restored, there is a closed path from line 40 to ground through motor magnet 53, interrupt contacts 532, and contacts 533, 512, and 502. Interrupt contacts 532 open every time current passes through same, thus interrupting the current through motor magnet 53, causing switch 531 to step. By repetitively interrupting, switch 531 is stepped by motor magnet 53 around to its home position, at which point contacts 533 are open, de-energizing motor magnet 53, and contacts 534 close. Motor magnet 54 and switches 541 through 5410 then pass through the same sequence, until the switches are homed, at which time contacts 5412 open, and contacts 5413 close. In a similar manner, switches 551 and 561 step to their home positions.

Although this invention has been described in terms of a specific embodiment thereof, it is understood that various changes can be made within the scope of this invention. Thus, if a single control station were to operate more than 10 receiving stations, a second stepper switch could be placed in parallel with switch 561, and two pulse trains representing the receiving station code would be transmitted, thereby providing capability to choose up to 100 receiving stations. Similarly, additional coded data representing "error" and "empty" signals could be generated by causing relays 57 and 64 to operate additional contacts, such additional coded data being transmitted to control station interface unit 14 for display.

What is claimed is:

1. Apparatus for the remote control of a storage device having a plurality of storage units, from a control-point, comprising:

a. a transmission system for transmission of coded electrical signals;

b. data input means for receiving control information;

c. control-point interface means comprising a conventional power supply and a switchable circuit, said switchable circuit being switched by said data input means, to generate said coded electrical signals representing said control information and compatible with said transmission system;

d. data transmitting means controlled by said control-point interface means, for coupling said coded electrical signals to said transmission system;

e. data receiving means, coupled to said transmission system for receiving said coded electrical signals;

f. receiving station interface means coupled to said data receiving means, for decoding said coded electrical signals received by said data receiving means, having a first selection and switching circuit to select a first digit corresponding to the selected storage unit, a second selection and switching circuit to select a second digit corresponding to the selected storage unit, and a third selection and switching circuit to actuate said selected storage unit when said storage device is selected;

g. storage device actuation means, coupled to and driven by said receiving station interface means, for energizing the selected storage unit upon which energization said selected storage unit releases a package stored therein; and, h. verification means, operated by said package release, and coupled to said transmission system, to provide an indication at said control-point of proper operation of the selected storage unit.

2. Apparatus as described in claim 1 comprising a plurality of storage devices, each of said plurality of storage devices having said data receiving means, said receiving station interface means, said storage device actuation means, and said verification means.

3. The apparatus as described in claim 2 wherein each said storage device actuation means is comprised of a plurality of solenoids, each of said solenoids operating one of said storage units.

4. The apparatus as described in claim 2 wherein said verification means comprises photocell means to detect the release of a package from one of said storage units, and to generate a signal which is transmitted to said control-point interface means, and relay means actuated by said transmitted signal for energizing a bulb which indicates the release of a package.

* * * * *

UNITED STATES PATENT OFFICE
CERTIFICATE OF CORRECTION

Patent No. 3,780,907 Dated December 25, 1973

Inventor(s) Walter E. Colburn, Howard M. Trowern, Jr. and Franklin W. Kerfoot, Jr.

It is certified that error appears in the above-identified patent and that said Letters Patent are hereby corrected as shown below:

Column 4, line 33, "plug" should read -- plus -- .

Column 4, line 39, "plug" should read -- plus -- .

Column 4, line 53, "plug" should read -- plus -- .

Column 6, line 49, "plug" should read -- plus -- .

Column 7, line 9, after "533", delete "are".

Signed and sealed this 6th day of May 1975.

(SEAL)
Attest:

RUTH C. MASON
Attesting Officer

C. MARSHALL DANN
Commissioner of Patents
and Trademarks

ORM PO-1050 (10-69)

USCOMM-DC 60376-P69
U.S. GOVERNMENT PRINTING OFFICE : 1969 O—366-334